United States Patent [19]

Menke

[11] Patent Number: 5,228,016
[45] Date of Patent: Jul. 13, 1993

[54] DISC PLAYER WITH TWO DISC STORAGE MAGAZINES

[75] Inventor: Wilhelm Menke, Wiesbaden, Fed. Rep. of Germany

[73] Assignee: NSM Apparatebau GmbH & Co. KG, Bingen, Fed. Rep. of Germany

[21] Appl. No.: 684,886
[22] PCT Filed: Oct. 17, 1989
[86] PCT No.: PCT/DE89/00659
    § 371 Date: Apr. 11, 1991
    § 102(e) Date: Apr. 11, 1991
[87] PCT Pub. No.: WO90/04845
    PCT Pub. Date: May 3, 1990

[30] Foreign Application Priority Data

Oct. 19, 1988 [DE] Fed. Rep. of Germany ....... 3835590
Jul. 11, 1989 [DE] Fed. Rep. of Germany ....... 3922721

[51] Int. Cl.$^5$ .................. G11B 17/22; G11B 17/08; G11B 33/02
[52] U.S. Cl. .................. 369/36; 369/75.2; 360/98.06
[58] Field of Search .................. 369/75.2, 77.1, 36; 360/98.06

[56] References Cited

U.S. PATENT DOCUMENTS

| | | | |
|---|---|---|---|
| 4,561,078 | 12/1985 | Nakayama | 369/38 |
| 4,614,474 | 9/1986 | Sudo | 360/98.06 |
| 4,682,313 | 7/1987 | Miyake | 369/39 |
| 4,815,056 | 3/1989 | Toi et al. | 369/36 |
| 4,827,463 | 5/1989 | Motoyoshi et al. | 369/36 |
| 4,903,252 | 2/1990 | Tanaka et al. | 360/98.06 |

FOREIGN PATENT DOCUMENTS

| | | |
|---|---|---|
| 0138005 | 4/1985 | European Pat. Off. |
| 0277634 | 8/1988 | European Pat. Off. |
| 0280263 | 8/1988 | European Pat. Off. |
| 0281006 | 9/1988 | European Pat. Off. |
| 0284445 | 9/1988 | European Pat. Off. |
| 3328328 | 2/1984 | Fed. Rep. of Germany |
| 3521913 | 3/1986 | Fed. Rep. of Germany |

*Primary Examiner*—Eugene R. LaRoche
*Assistant Examiner*—Michael C. Kessell
*Attorney, Agent, or Firm*—Spencer, Frank & Schneider

[57] ABSTRACT

A disc player (1) has two record storage magazines (3) with a multiplicity of stacked disc holders (6), each holding a disc (5), in storage compartments (10). A transporting device (4) moves a selected disc (5) with its holder (6) to and fro between a storage compartment (10) and a playback unit (7). The transporting device (4) has two independently controllable extraction devices (12) for the disc holders (6), and these extraction devices (12) may travel horizontally on the transporting device (4). Either the two extraction devices (12) are ready to extract a holder (6) for a disc (5) from the appropriate record storage magazine (3), or one extraction device (12) has been taken to a central position in which it secures a disc (5) with its holder (6) taken from the appropriate record storage magazine (3) in alignment with the turntable (8) of the playback unit (7) while the other extraction device (12) remains in readiness for the other record storage magazine (3).

35 Claims, 9 Drawing Sheets

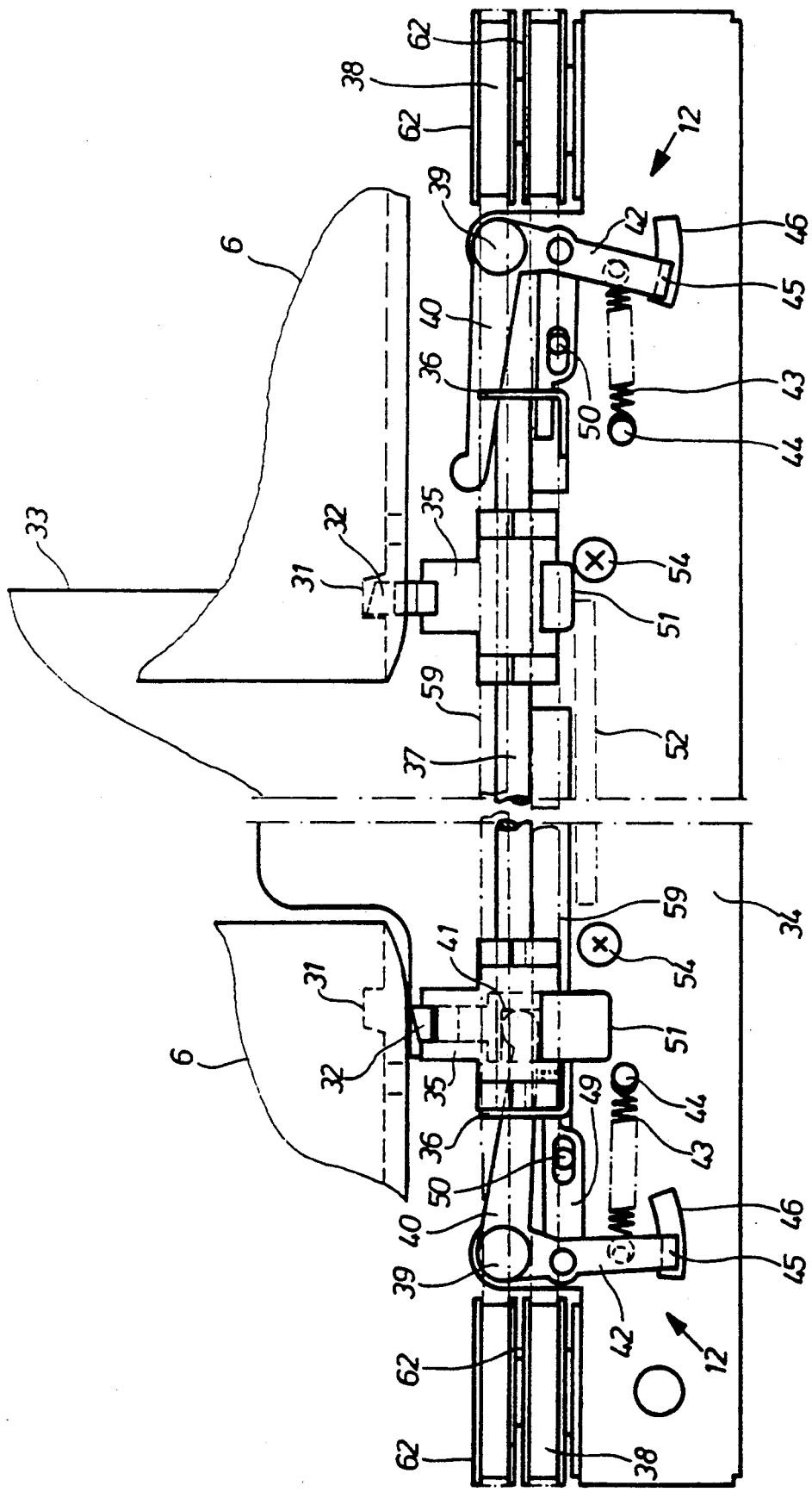

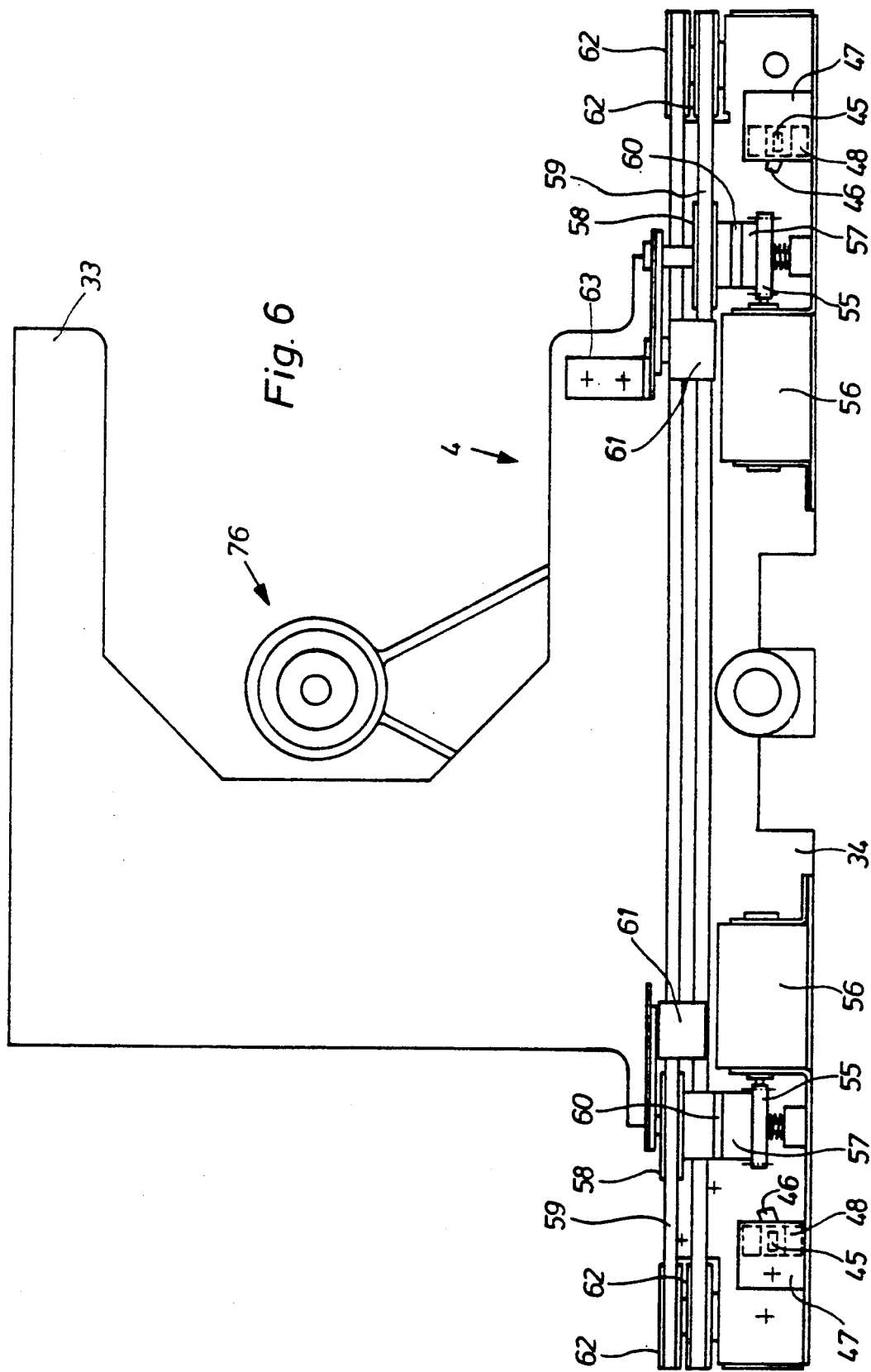

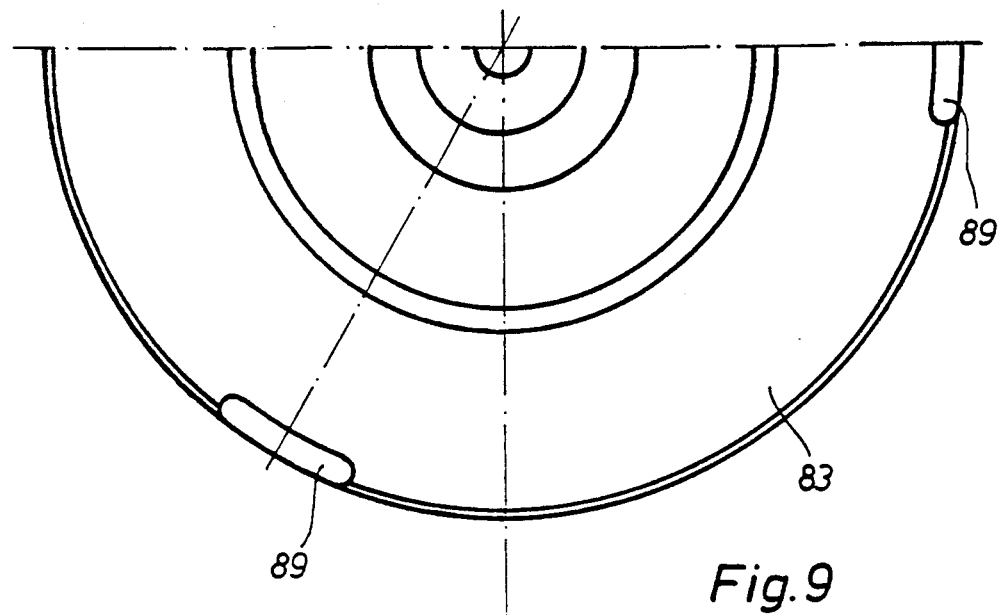
Fig. 9
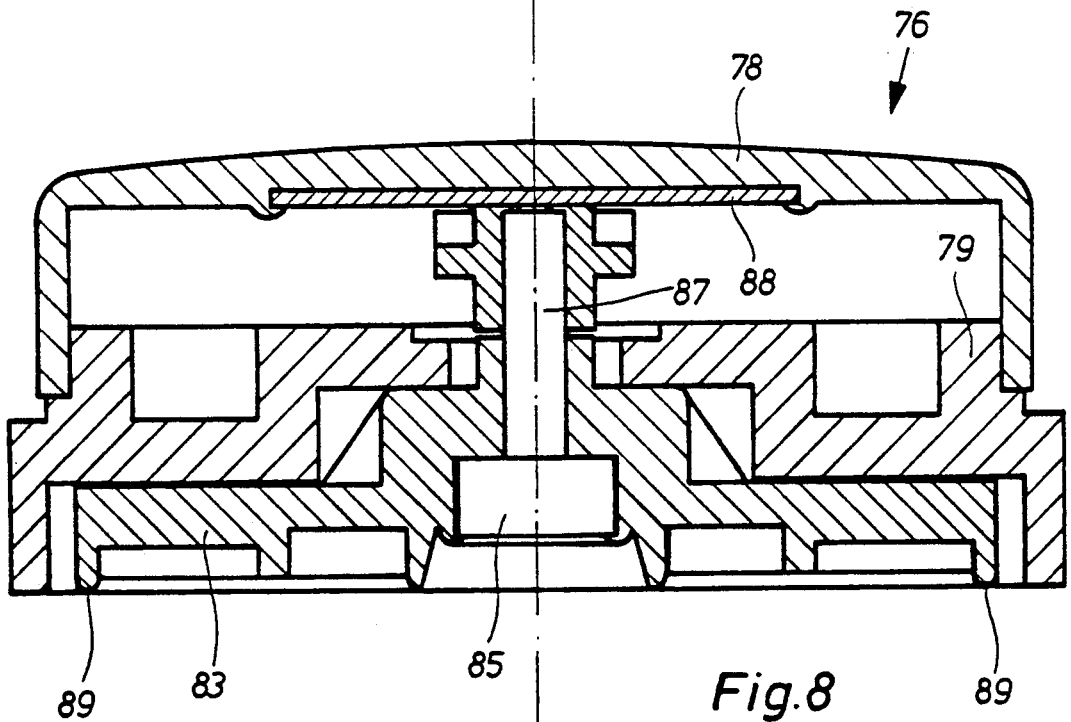
Fig. 8
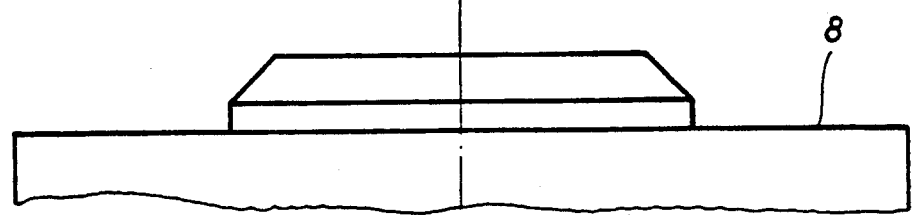

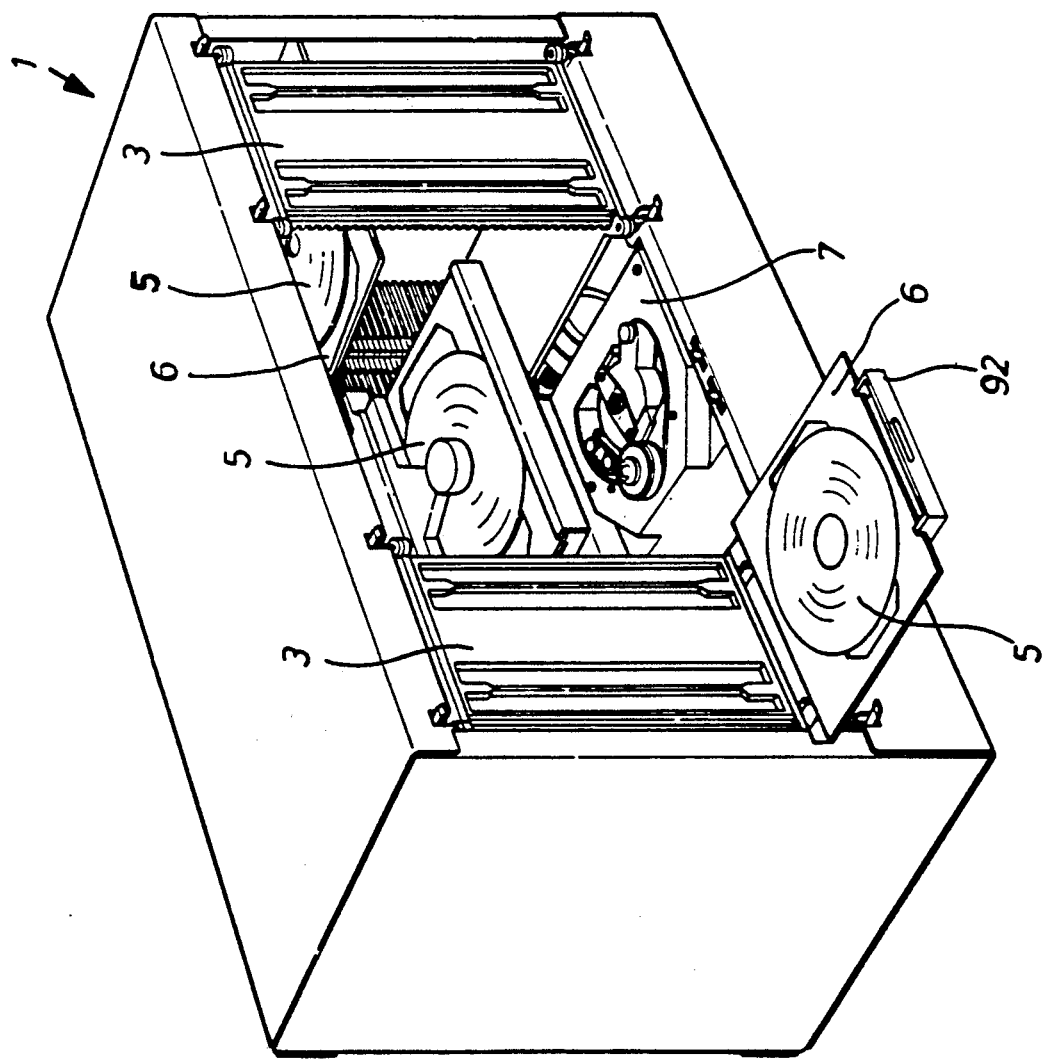

DISC PLAYER WITH TWO DISC STORAGE MAGAZINES

BACKGROUND OF THE INVENTION

The invention relates to a disc player including two disc storage magazines which are disposed opposite one another and which are provided with a plurality of superposed disc holders that are stored in compartments. Each disc holder accommodates one disc. The player further comprises a transporting device that includes an extraction device equipped with a gripping arm and is movable in the stack direction of the disc storage magazines so as to transport a desired disc and the associated disc holder back and forth between the compartment and a playback unit.

DE 3,521,913.C2 discloses a disc player having two oppositely disposed disc storage magazines between which a chute extends in the vertical direction. Within the chute, a playback unit is displaceable with the aid of a lifting device. A disc extraction device is disposed at the rear of the disc storage magazines and is equipped with extraction arms which can be moved toward and away from one another. Moreover, the extraction arms are also vertically or laterally displaceable by means of the disc extraction device. Thus, in order to play a disc, it is necessary, on the one hand, to displace the playback unit by means of the lifting device to a height which coincides with the height of the disc holder carrying the selected disc in the disc storage magazine and, on the other hand, to bring the extraction arms of the disc extraction device to this height by moving the disc extraction device in the vertical direction so as to transport the turntable carrying the desired disc to the playback unit. Therefore, in order to play a disc, the playback unit and the disc extraction device must each be moved as a separate component.

Additionally, DE 3,328,328.A1 discloses a disc changer including a playback device, a turntable rotatably mounted in a frame, and a loading device for transporting a disc away from and to the turntable. The loading device includes a platform which is able to move up and down relative to the turntable, a magazine including a number of disc holders which are displaceable horizontally into and out of the platform, a transporting mechanism which cooperates with the respective disc holders along the platform in order to move the disc holders out of the magazine to the platform, and a lifting mechanism including a lifting compartment for the magazine in order to move the magazine into a desired height position. In order to press a disc against the turntable, the loading device cooperates by means of a pivotally mounted, spring tensioned press-on lever with a disc hold-down member. Thus, playing a disc here requires moving the magazine with the aid of the lifting mechanism of the lifting compartment, starting the transporting mechanism for the disc holder, moving the platform in the direction toward the playback device and pivoting the press-on lever together with the disc hold-down member. Therefore, in this disc changer as well, two separate components must be moved relative to one another, namely the magazine and the platform.

Furthermore, EP 0,138,005.B1 discloses a disc changer in which a vertically displaceable disc removal device is disposed between two vertical disc sleeves which accommodate disc magazines in which discs are stored. The disc removal device supports a disc sleeve gripper which is horizontally displaceable thereon. This disc sleeve gripper is provided with two gripping devices, one of which is selectively disposed in its ready position in the left or right disc magazine while the other gripping device holds a removed disc sleeve in the center position in which the disc is disposed above the turntable of the playback device. Thus only one gripping device of the disc sleeve gripper is able at any one time to take on a ready position for removing a disc sleeve from the associated disc magazine. That is, if a disc sleeve is to be removed from the other disc magazine, the disc sleeve gripper must first be moved in the direction of this disc magazine to bring the other gripping device into a ready position for the removal of a disc sleeve from its associated disc magazine, which constitutes an additional displacement path for the disc sleeve gripper, increasing the time for transporting the disc sleeve containing the desired disc from the disc magazine to the turntable of the playback unit.

Finally, EP 0,280,263.A2 discloses a disc player in which the discs are deposited in two stacks and can be played at two playing stations. The individual discs can be played from two sides. After playing, the discs are no longer returned to the same stack. In this device, an endless conveyor belt is configured as an extraction device. Thus, it is possible to remove a disc from one of the two magazines without waiting time. The position of the extraction device of this unit cannot be utilized to monitor the disc position. The slightest irregularity during transport of the discs, for example, upon transfer of the discs from the playback device or due to shocks to the system, may lead to serious disturbances in operation which are unacceptable.

SUMMARY OF THE INVENTION

It is an object of the invention to provide a disc player of the above-mentioned type which, with a simple and compact configuration, permits extremely short paths to be traversed for the transporting of a disc holder carrying the desired disc from the respective disc storage magazine to the playback unit and vice versa.

This is accomplished by the invention in that the transporting device includes a second extraction device for the disc holders which is independently controllable of the first extraction device, with the two extraction devices, which are horizontally movable on the transporting device, each being in a ready position for the removal of a disc holder for a disc disposed in the associated disc storage magazine, or with the one extraction device being moved into a center position in which it fixes the disc and its disc holder, after removal from the associated disc storage magazine, concentrically with the turntable of the playback unit while the other extraction device remains in its ready position for the other disc storage magazine.

The disc player according to the invention is thus provided with two disc holder extraction devices which can each be controlled independently of the other and which may both be in their respective ready positions in the disc storage magazines or one of which is moved into the center position in which it has transported a disc holder onto the transporting device while the other extraction device remains in its ready position in the other disc storage magazine. This results in an optimally short transporting path for the individual disc and the associated disc holder so that the transporting times for the disc and the disc holder are correspondingly short.

Consequently, the information stored on the disc can be made audible relatively quickly.

The disc player according to the invention is particularly suitable for the use of a playback unit which employs a laser light pen to scan an audio disc. Such discs, known as "compact discs", have a long playing time and nevertheless a small diameter up to 8 cm, so that it is possible to employ a playback unit and disc storage magazines of a compact construction giving the disc player as a whole a relatively small structural size.

In order for the disc to be most accurately positioned for playing on the turntable of the playback unit, an advantageous feature of the invention provides that the transporting device which carries a disc and its disc holder, when moved downward into its end position beyond the playback unit, places the disc onto the turntable by lifting it out of the disc holder and presses it against the turntable by means of a disc hold-down member fixed to the transporting device.

In order to permit the playing of discs in immediate timely succession, as it is required in discotheques, a further feature of the invention arranges a plurality of playback units, each having its associated transporting device, in a row through the intermediary of a disc storage magazine which is open on both sides and is accessible to adjacent transporting devices, with a further disc storage magazine being provided at each end of the row.

To facilitate the changing of discs in the magazines, each disc storage magazine, according to an advantageous modification of the invention, is locked in its stationary position with the housing of the disc player, can be pivoted out of the housing about a pivot axis as soon as a first lock has been released and can be removed from the housing after a second lock has been released. Advisably, the two locks on the disc storage magazine are here connected with a displacement lever by way of a rod assembly in such a manner that the disc storage magazine is unlocked when the displacement lever is moved in the one direction enabling it to pivot out and is unlocked in the other direction for removal. This enhances ease of operation.

In order to prevent the disc holders from sliding out of the disc storage magazine while the disc player is possibly in a pivoted position, for example during transport of the disc player, an advantageous feature of the solution according to the invention has each disc holder positioned in a secure position in the compartment by means of two oppositely disposed spring elements attached to the disc storage magazine. In this position the disc holder projects beyond the disc storage magazine to the extent that it can be gripped by the extraction device of the transporting device. Advisably, each spring element is here configured as a U-shaped bar whose legs engage in guide grooves at the disc storage magazine and whose cross bar is given a notch in the center which engages in a recess disposed at the corresponding long side of the disc holder. Preferably, the bars which are associated with the receiving compartments on one side are connected with one another to form a continuous band in the region of their legs so that the installation of the spring elements is substantially facilitated.

It is further preferred for the disc holder to be provided with a plurality of nubs on its underside in the plane of the oppositely disposed recesses so as to prevent the disc lying on the disc holder therebelow from falling out. Advisably, one of the nubs cooperates with a switch contact for determining the presence of a disc in the compartment.

In order to realize a particularly simple and reliable position of the disc in the disc holder and release of the same during the playing process, an advantageous feature of the invention provides the disc holder with a recess for accommodating the disc. This recess has a sloped edge region which changes to a vertical edge region. In the bottom of the recess, there is an opening into which the turntable of the playback unit can be introduced. The bottom of the recess has an edge shoulder which is divided into two opposing segments so as to support the disc in its edge region where no data are stored.

In order for the disc holder to be gripped by the extraction device of the transporting device independently of its inserted position in the compartment, an advantageous feature of the invention provides the disc holder with a recess at its long sides, in each case in the forward region on the underside and, corresponding to the position of the disc holder in the compartment, the gripping arm of the extraction device of the transporting device can be brought into engagement with one of these recesses.

In a particularly advantageous embodiment of the extraction device of the transporting device, the gripping arm can be moved into and out of a reciprocating carriage and, in the starting position of the carriage, is held in its inserted position by a spring tensioned angle lever with associated stop lever so that, if the carriage moves out of the starting position, the angle lever moves the carriage into the extended position in which it engages in the recess of the disc holder. Thereafter the carriage remains in that position due to the provision of a stationary stop lying against its rear side. Preferably, the stop lever articulated to the angle lever is able to pivot the angle lever in such a manner that, when the carriage moves into its starting position delimited by a stop angle, the angle lever engages in a corresponding recess in the gripping arm and pulls the latter into its retracted position in the carriage. Preferably a light barrier is associated with the angle lever so as to determine the starting position of the carriage. Advisably, the abutment for the rear of the gripping arm is formed by a wall of the upper portion of the transporting device and by a round pin which is disposed at the end next to this wall and is fastened to the lower portion of the transporting device.

For reliable back and forth movement of the carriage, an advantageous modification of the solution according to the invention provides that the carriages of the extraction devices (12), which carriages are guided on a carrying rod so as to be slidably movable, can each be driven by way of a belt drive and worm gear and by a motor whose direction of rotation can be reversed. Of course, instead of the belt drive, a cable pulley, a spindle drive or the like may also be employed.

In order to make the carriage manually movable as well, a friction clutch is advisably provided between the worm gear and the drive wheel of the toothed belt of the belt drive. Moreover, when a disc holder is removed from a compartment by means of the carriage of the one extraction device, the carriage of the other extraction device preferably lies in the end position of the disc holder on a U-shaped supporting arm of the transporting device to serve as abutment.

For monitoring the correct position of the disc holder on the U-shaped supporting arm of the transporting device, an advantageous modification of the invention provides that the supporting arm of the transporting device has an associated light barrier for monitoring the concentric position of the disc stored in the disc holder relative to the turntable of the playback unit, with the disc holder being provided with an appropriately disposed light passage opening. As an alternative, it is also possible to associate each end of the supporting arm of the transporting device with a light barrier for monitoring the concentric position of the disc stored in the disc holder relative to the turntable of the playback unit.

In order to realize a compact association of the transporting device with the playback unit and the disc storage magazine, a further advantageous feature of the invention provides that the transporting device is mounted so as to be slidably movable on two vertically extending guide rods which are attached to the rear of the housing. The transporting device can be moved up and down by means of a double belt drive and a drive motor whose direction of rotation is reversible. Of course, a rope pulley, a spindle drive or the like may also be employed instead of the belt drive. Preferably the drive motor which is configured as a stepping motor, is provided with a vane wheel on its shaft, with this wheel running in the fork of a fork coupler generating positioning pulses. In this way, it is ensured that the transporting device is held in front of the compartments of the disc storage magazine at the precise intended position.

In order to realize a simply configured and reliably operating disc hold-down member in the transporting device, the disc hold-down member in a further advantageous embodiment of the invention includes a stationary holding arm extending parallel to the supporting arm of the transporting device and equipped with a holding head in which a disc press-on insert including a magnet disposed in its center is arranged so as to be longitudinally displaceable and able to freely swing back and forth, with the magnet cooperating with the magnetizable drive shaft of the turntable of the playback unit. Advisably, the disc press-on insert of the holding head is provided with a circumferential flat rubber ring on its edge. This ring, due to the force acting between the magnet and the drive shaft of the turntable, presses the disc onto the turntable when the transporting device is in its end position. Furthermore, the disc press-on insert is preferably supported, by way of a cone connected with it, in a corresponding receiving opening of a partition in the holding head.

In an advantageous alternative embodiment of the invention, the disc hold-down member is provided with a stationary holding arm and holding head which extend parallel to the supporting arm of the transporting device and in which a disc press-on insert including a magnet disposed in its center is mounted so as to be longitudinally displaceable with a relatively large amount of play. In the rest position of the disc press-on insert, the magnet cooperates with a magnetizable steel plate inserted into the holding head and, in the operating position of the disc press-on insert, the magnet cooperates with the magnetizable drive shaft of the turntable of the playback unit. Thus, in the rest position of the disc hold-down member, there results a defined distance from the disc holder and its inserted disc, which ensures low structural height. Preferably, the magnetizable steel plate is clipped into the underside of the cover of the holding head and cooperates with the magnet by way of a magnetizable steel rod which is inserted into the disc press-on insert. In order to fix the disc reliably on the turntable, the disc press-on insert is advisably provided with three 120° offset nubs on the periphery of its underside. Due to the action of forces between the magnet and the drive shaft of the turntable in the position of the transporting device, these nubs urge the disc onto the turntable.

According to another advantageous modification of the subject matter of the invention, a disc storage magazine has an associated drawer which accommodates a disc holder and an inserted disc. In the inserted state of the drawer, this disc holder and its disc can be transported by means of the transporting device to the playback unit and back from there into the drawer and, in the pulled-out state of the drawer, the disc carried by the disc holder can be exchanged manually. In this way, it is possible in a simple manner to play and store an individual disc without having to correspondingly change it in a disc storage magazine, that is, a disc not included in a disc storage magazine can be played and stored individually.

In order to permit the direct playing of an individual disc, a special operator key is preferably provided at the disc player by way of which the transporting device can be moved from its lower end position into an upper end position and subsequently back into the lower end position, with the playback unit being turned on by way of a further operator key. In the upper end position of the transporting device, it is thus possible to manually place a single disc onto the turntable of the playback unit and to remove it again.

BRIEF DESCRIPTION OF THE DRAWINGS

FIG. 5 is a top view of the rear portion of the transporting device of the disc player of FIG. 1 to an enlarged scale and with the central region and the upper portion of the transporting device omitted;

FIG. 6 is a bottom view to an enlarged scale of the transporting device of the disc player of FIG. 1;

FIG. 8 is a front view to an enlarged scale of an alternative embodiment of the disc hold-down member of the transporting device of FIG. 7 in the rest position;

FIG. 9 is a partial bottom view of the disc hold-down member of FIG. 8;

FIG. 11 is a perspective view of the disc player of FIG. 1 including a drawer for accommodating a single disc holder with inserted disc.

DESCRIPTION OF THE PREFERRED EMBODIMENT

Figure 1:
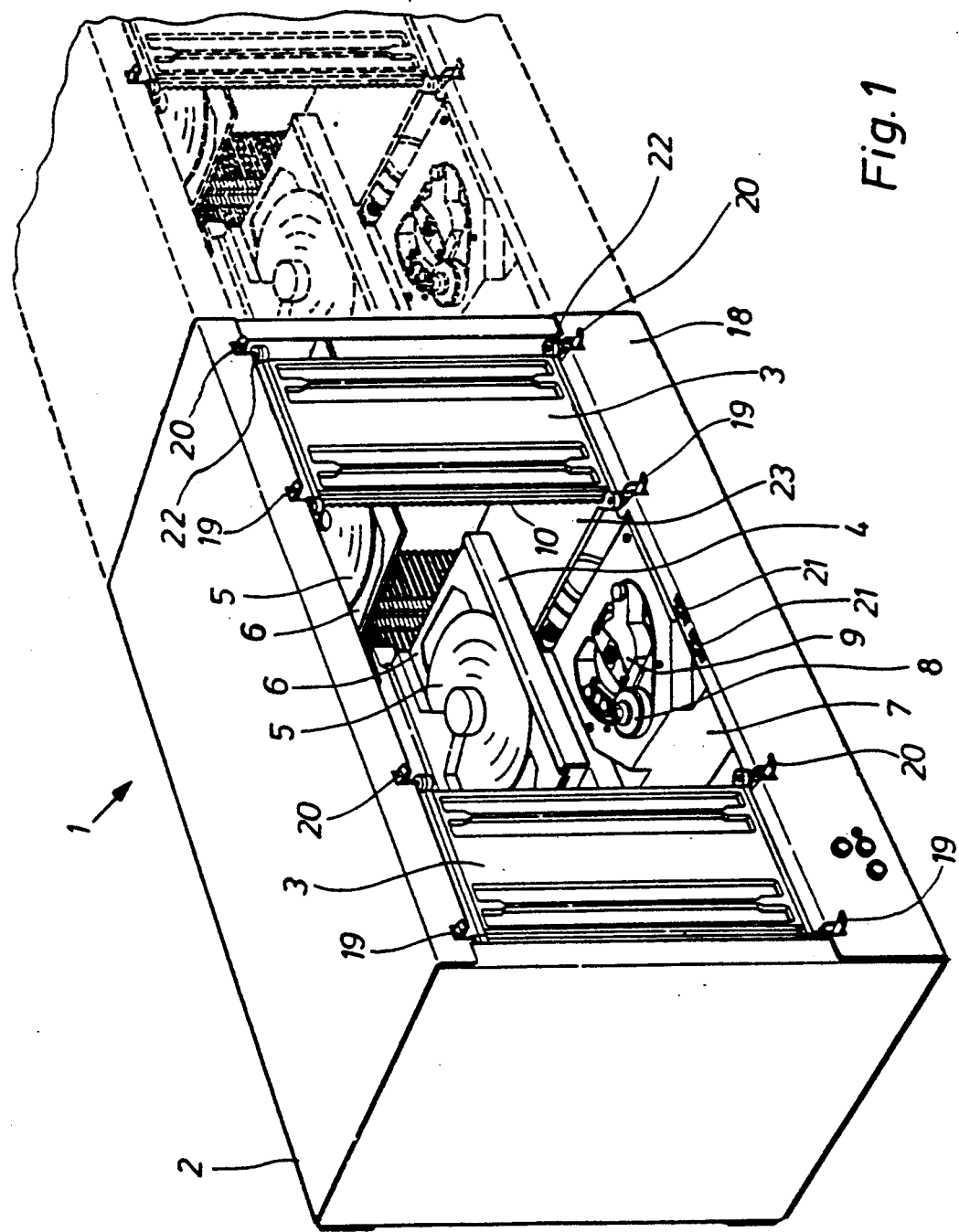
FIG. 1 is a perspective view of a disc player showing a further, series connected disc player in dashed lines.

Information stored on discs can be read out, (for example, optically) and reproduced by a disc player 1. The disc player 1 comprises a housing 2 having an associated operating panel (not shown) which includes various keys, for example a disc selection key, a disc playing key and a stop key. On the side of the housing 2, disc storage magazines 3 are arranged opposite one another. In the space between disc storage magazines 3, there is disposed a transporting device 4 that can be moved up and down to move a disc holder 6 accommodating a disc 5. A playback unit 7 including a turntable 8, a motor (not shown) for rotating turntable 8, and a playing head 9 is arranged stationarily between and below the two oppositely disposed disc storage magazines 3.

Figure 2:
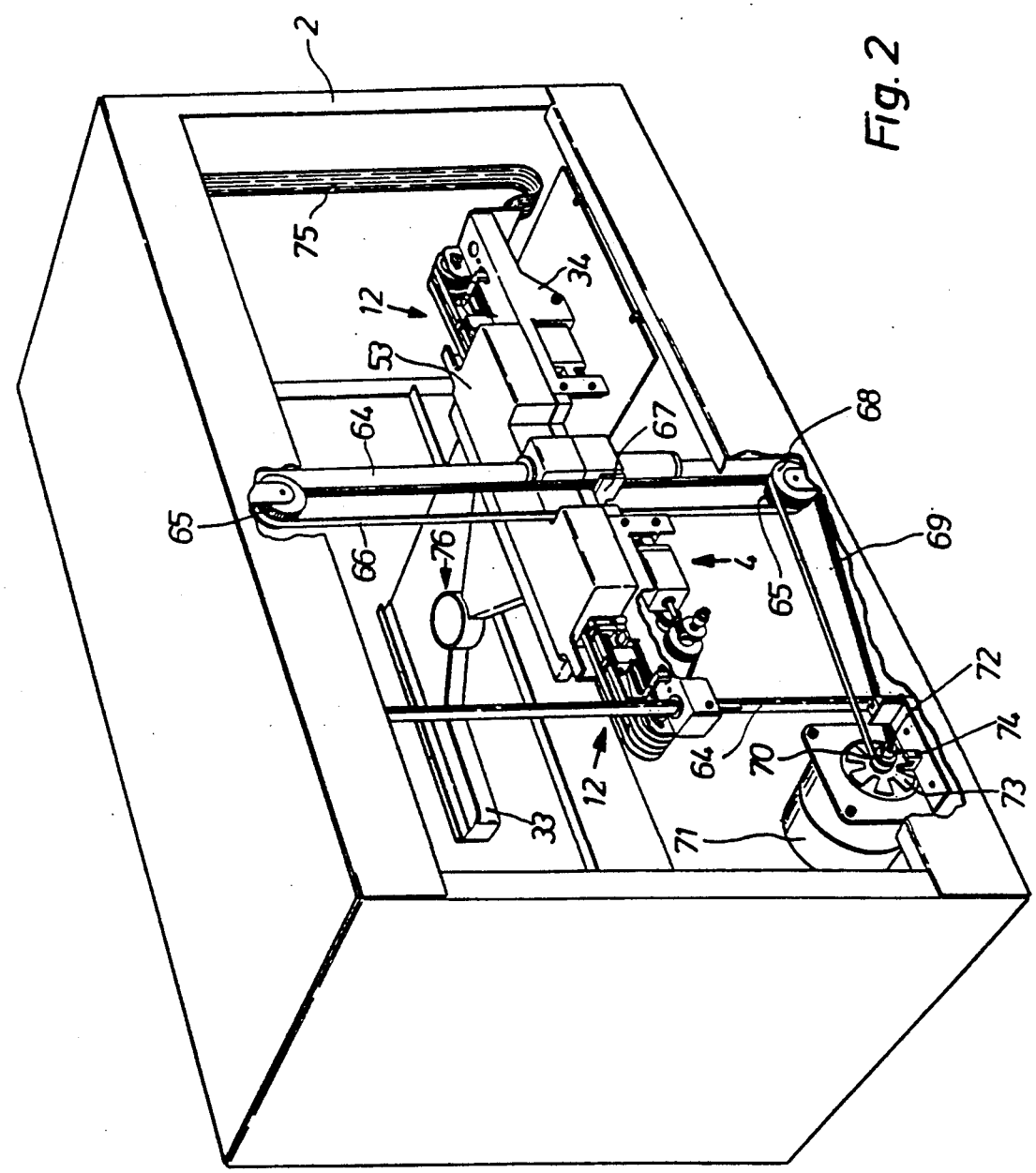
FIG. 2 is a perspective rear view of the disc player of FIG. 1 in an enlarged representation but, for the sake of clarity, without the oppositely disposed disc storage magazines.
Figures 3, 4:
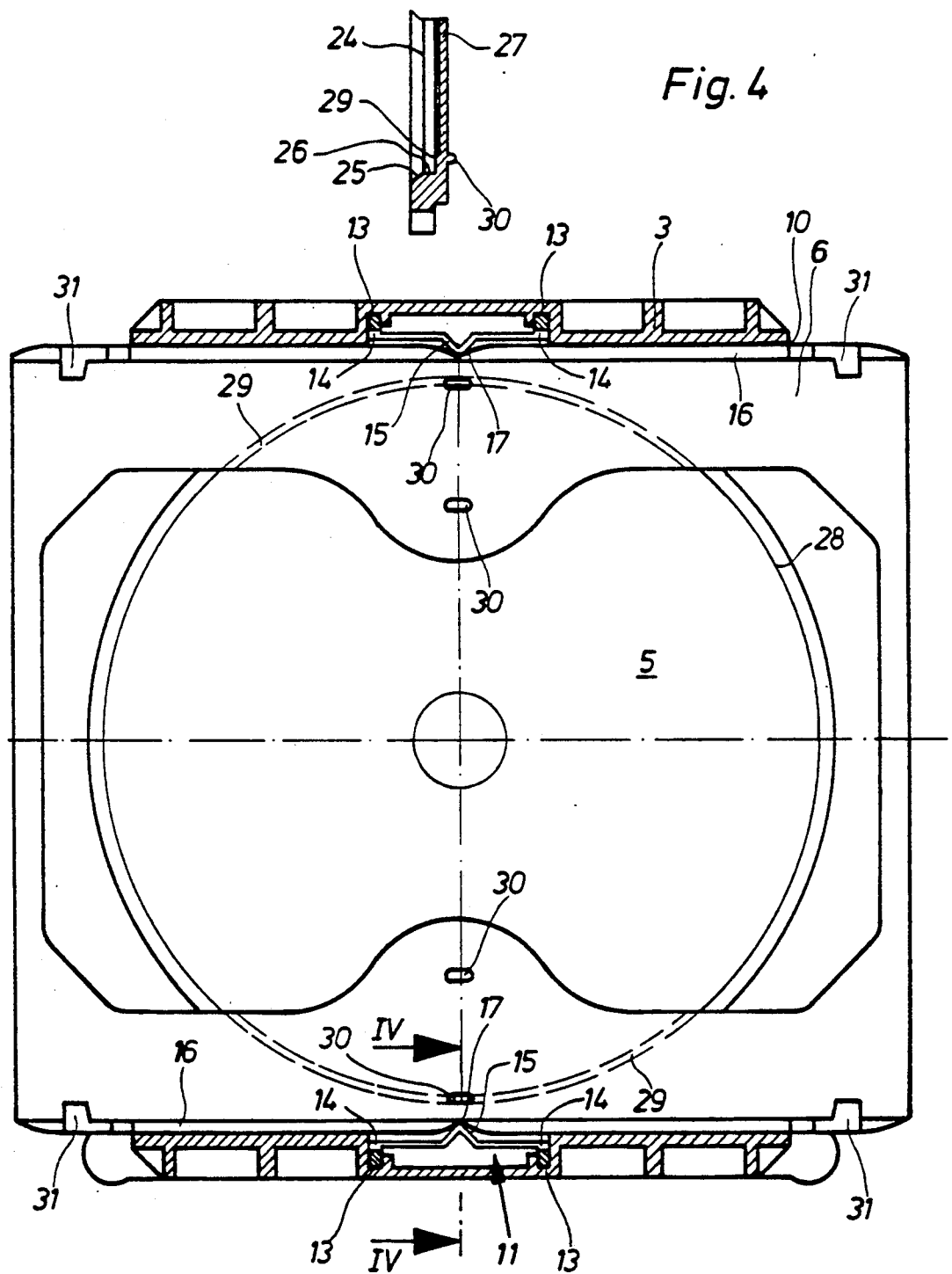
FIG. 3 is a cross-sectional view seen from the bottom and to an enlarged scale of a disc storage magazine of the disc player of FIG. 1.
FIG. 4 is a sectional view of the disc holder of FIG. 3 seen along line IV—IV.

Both disc storage magazines 3 have the identical configuration and are each equipped with a plurality of superposed compartments 10 for the storage of a corresponding number of disc holders 6 each accommodating one disc 5. In compartment 10, disc holder 6 is secured in its position by means of two oppositely disposed spring elements 11 (see FIG. 3) which are attached to disc storage magazine 3. In this position, disc holder 6 projects beyond the two possible extraction sides of disc storage magazine 3 enabling an extraction device 12 (see FIGS. 2 and 5) of transporting device 4 to grip it. On each of the oppositely disposed interior faces of disc storage magazine 3 there are disposed two guide grooves 13 (see FIG. 3) which engage the legs of spring elements 11 that are configured as U-shaped bars. The crossbar of each spring element 11 is provided with a notch 15 in the center which projects into the interior of compartment 10 and engages in a recess 17 arranged centrally at the corresponding long side 16 of disc holder 6. In order to facilitate manufacture and installation of the spring elements, spring elements 11 are combined into a continuous band on each side of compartments 10, with the springs being connected with one another in the region of their legs 14.

Each disc storage magazine 3 is held in its stationary position by way of two locks 19, 20 attached to the frontal face 18 of housing 2. Each lock is composed of an upper and a lower snap-in mechanism. Both locks 19, 20 are connected by way of a rod assembly, not shown, with a displacement lever 21. Movement of displacement lever 21 in the direction toward disc storage magazine 3 causes the first lock 19 to be released so that disc storage magazine 3 is able to be pivoted about pivot axis 22 to the exterior of housing 2, to thus facilitate the exchange of discs 5 stored in disc holders 6. Movement of displacement lever 21 away from disc storage magazine 3 also releases the second lock 20 so that disc storage magazine 3 as a whole can be removed from housing 2. Of course, transporting device 4 must be in its end position below the bottom 23 of disc storage magazine 3 during the outward pivoting and removal of disc storage magazine 3.

At its upper face, disc holder 6 has a central recess 24 (see FIG. 4) to accommodate disc 5. Recess 24 has a sloped edge region 25 which changes to a vertical edge region 26. The diameter of the vertical edge region 26 of recess 24 is here somewhat larger than the diameter of disc 5. An opening 28 (see FIG. 3) is provided in the bottom 27 of recess 24 into which, on the one hand, turntable 8 can be introduced from the bottom in order to rotate disc 5 and through which, on the other hand, the light beam of playing head 9 scans disc 5. A shoulder edge 29 provided at the bottom 27 of recess 24 serves to support disc 5 in its edge region which carries no stored data. Due to opening 28, this shoulder edge is subdivided into two facing segments. In the plane of the oppositely disposed recesses 17, a plurality of juxtaposed nubs 30 are provided on the underside of bottom 27 so as to accommodate the spring elements 11. These nubs 30 prevent the disc 5 resting on its disc holder 6 below it from falling out when the disc storage magazine 3 is in an oblique position. In order to be able to check the correct position of disc holder 6 in compartment 10, one of nubs 30 may be associated with a switch contact fastened to disc storage magazine 3.

On each one of its long sides 16, disc holder 6 is provided with a recess 31, in each case in the forward region of its underside. Corresponding to the association of transporting device 4 with disc storage magazine 3 and the insertion position of disc holder 6 in compartment 10, a gripping arm 32 (see FIG. 5) of extraction device 12 of transporting device 4 is able to engage in one of these recesses 31 in order to transport disc holder 6 onto a U-shaped carrier arm 33 (also see FIGS. 2 and 6) at the bottom portion 34 of transporting device 4. Gripping arm 32 is mounted so as to move in and out in a carriage 35, with carriage 35 moving back and forth by means of a belt drive 38 on a supporting rod 37 extending between two stop angles 36. In the starting position, carriage 35 lies against stop angle 36 and gripping arm 32 is held in its position in which it is retracted into carriage 35 by a spring tensioned angle lever 39 which is articulated to bottom portion 34. The free end of one arm 40 of angle lever 39 engages in a corresponding recess 41 in gripping arm 32. The other arm 42 of angle lever 39 is connected with a tension spring 43 that is fastened to a pin 44 attached to lower portion 34. At its end, arm 42 is provided with an angled portion 45 which cooperates, through an opening 46 in lower portion 34, with a light barrier 48 (see FIG. 6) provided on the underside of lower portion 34 on a printed circuit board 47 in order to monitor the starting position of carriage 35. Moreover, a stop lever 49 is hinged to arm 42 and is guided by way of a pin/long hole connection 50 so that, when carriage 35 moves toward stop angle 46, the free end of stop lever 49 comes to lie on carriage 35 and thus the angle lever is pivoted against the force of tension spring 43, thus introducing arm 40 into a recess 41 in gripping arm 32 and returning gripping arm 32 into its retracted position in carriage 35. If the carriage is moved out of its starting position away from stop angle 36, the force of tension spring 43 pivots angle lever 39, thus moving gripping arm 32 out of carriage 35 beyond the arm 40 of angle lever 39 to engage the recess 31 in disc holder 6 which faces it. Shortly before gripping arm 32 is released by arm 40 of angle lever 39, the rear face 51 of gripping arm 32 comes to lie against a stop in order to prevent gripping arm 32 from sliding out of its extended position. This stop is formed by a wall 52 of upper portion 53 (see FIG. 2) of transporting device 4 and by a round pin 54 lying next to this wall 52 at the ends and fastened to the lower portion 34 of transporting device 4.

The belt drive 38 for movement of carriage 35 includes a worm gear 55 (see FIG. 6) and a motor 56 whose direction of rotation is reversible. The worm wheel of worm gear 55 is connected with a cylindrical extension 57 of a drive wheel 58 for the toothed belt 59 of belt drive 38. A friction coupling 60 is built into the extension 57 of drive wheel 58. A tensioning roller 61 for toothed belt 59 is disposed in the vicinity of drive wheel 58. The toothed belt is guided over reversal rollers 62 attached at the ends of transporting device 4 and is fastened to carriage 35. Carriage 35 which belongs to the left extraction device 12 (see FIG. 5) is connected with the rear toothed belt 59 while carriage 35 of the extraction device 12 disposed on the right is fastened to the forward toothed belt 59. Upon the removal of a disc holder 6 from a compartment 10 by means of the carriage 35 of the one extraction device 12, the carriage 35 of the other extraction device 12 serves as abutment, if disc holder 6 is in its end position on the U-shaped supporting arm 33 of transporting device 4, in which the disc 5 stored in disc holder 6 is concentric with turntable 8 of playback unit 7. In order to monitor this concentric position of disc 5, a light barrier 63 (see FIG. 6) is provided at supporting arm 33 and cooperates with a light passage opening appropriately provided in disc holder 6.

Figure 7:
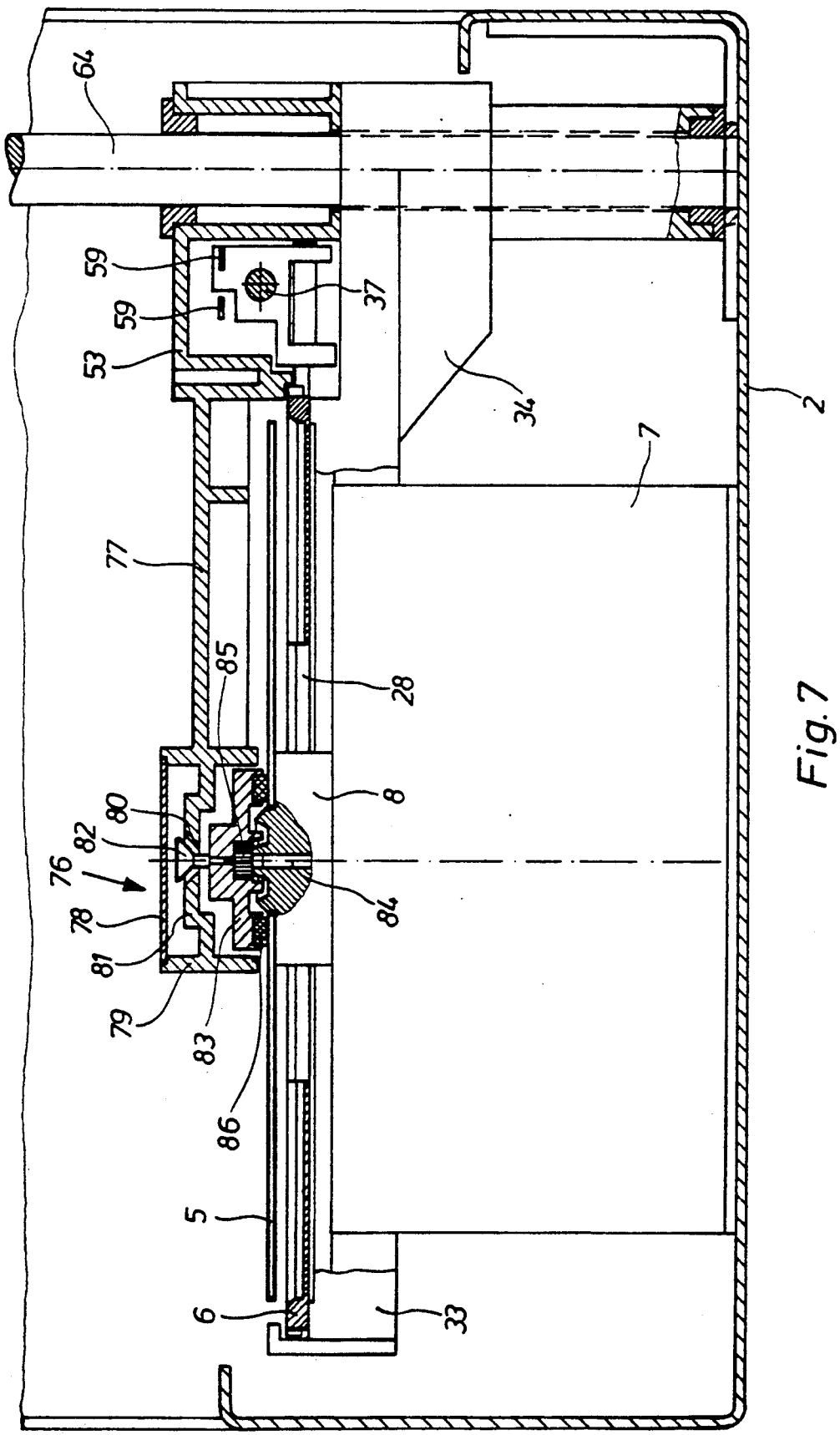
FIG. 7 is a front view to an enlarged scale, partially in section, of the transporting device and of the playback unit of the disc player of FIG. 1 during playing of a disc.

Two mutually parallel and vertically extending guide rods 64 (see FIGS. 2 and 7) are disposed on the rear of housing 2 and provide for slidable movement of transporting device 4. The guide rod 64 arranged centrally in housing 2 has an associated parallel toothed belt 66 which is guided over reversal rollers 65 and which is connected by way of a clamp mount 67 with transporting device 4. The lower reversal roller 65 for toothed belt 66 is coupled with a further reversal roller 68 for a toothed belt 69 which is connected with the drive wheel 70 of a drive motor 71 whose direction of rotation is reversible. The shaft 72 of drive motor 71 further supports a vane wheel 73 whose vanes move in the fork of a fork coupler 74 that generates positioning pulses. With the aid of the positioning pulses it is possible to realize an accurate association of transporting device 4 with the compartments 10 of disc storage magazines 3. Moreover, transporting device 4 is connected by way of a flexible guide cable 75 with the control device (not shown) of the disc player.

A disc hold-down member 76 is disposed at the upper portion 53 of transporting device 4. A holding arm 77 (see FIG. 7) extending from upper portion 53 parallel to support arm 33 of transporting device 4 is provided at its free end with a holding head 79 that is closed by a cover 78. In the conical receiving opening 80 of a partition 81 of holding head 79, there is provided a cone 82 which is mounted so as to be longitudinally displaceable and able to swing back and forth freely. The cone is connected with a disc press-on insert 83 disposed within holding head 79. A magnet 85 is disposed in the center of the disc press-on insert 83 and cooperates with the magnetizable drive shaft 84 of turntable 8 of playback unit 7. On its side facing disc 5, the edge of disc press-on insert 83 is provided with a circumferential flat rubber ring 86. Due to the force acting between magnet 85 and drive shaft 84 when transporting device 4 is in its end position, in which disc holder 6 is disposed below the top of turntable 8 and has released the disc 5 stored in it, the flat rubber ring presses this disc 5 against turntable 8.

Figure 10:
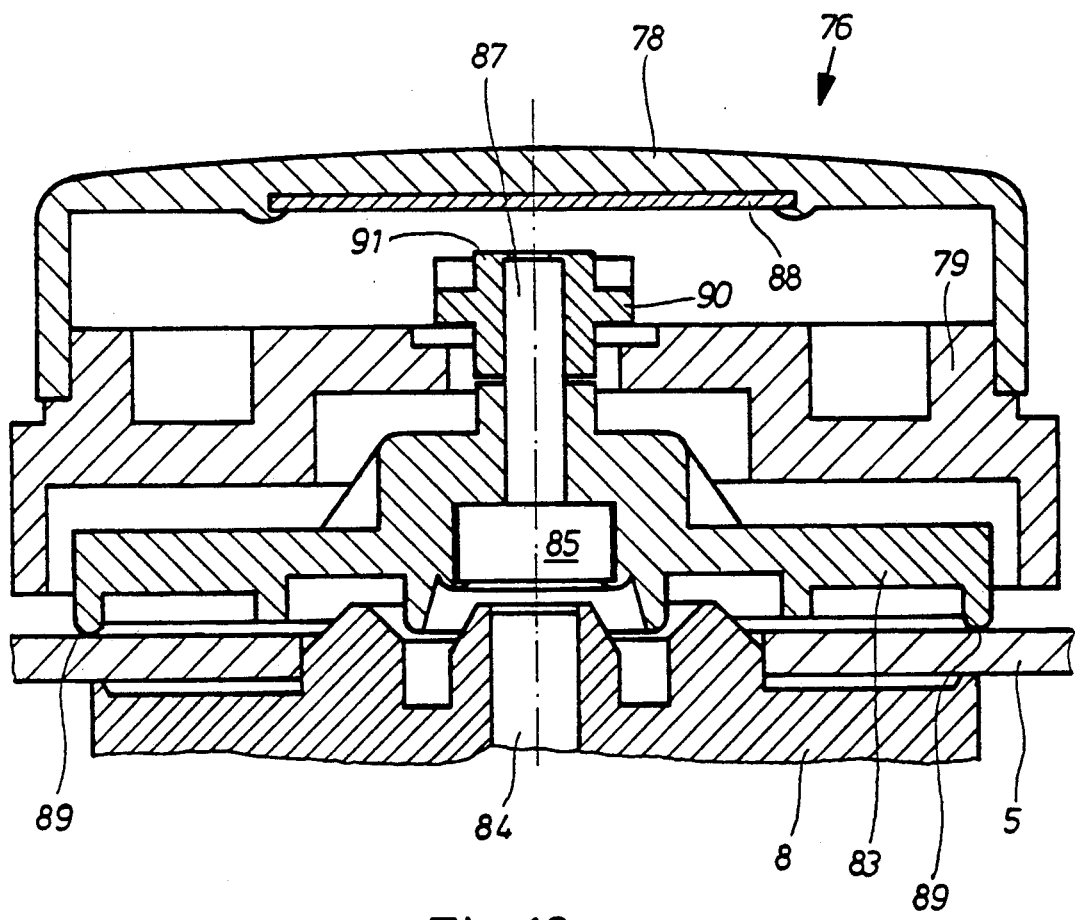
FIG. 10 is a sectional view of the disc hold-down member of FIG. 8 in the operating position.

In the alternative embodiment of disc hold-down member 76 shown in FIGS. 8 to 10, holding head 79 accommodates disc press-on insert 83 in a manner making it longitudinally displaceable with relatively great lateral play. A magnetizable steel rod 87 which, in the rest position of disc press-on insert 83, extends to shortly below cover 78 of holding head 79, rests on a magnet 85 disposed in the center of disc press-on insert 83. A magnetizable steel plate 88 is clipped into the underside of cover 78 and cooperates by way of steel rod 87 with magnet 85 to thus hold disc press-on insert 8 in its rest position within holding head 79. If now transporting device 4 and disc hold-down member 76 move into their end position, the magnetic force between magnet 85 and the magnetizable drive shaft 84 of turntable 8 becomes greater than the magnetic force between magnet 85 as well as magnetizable steel rod 87 and the magnetizable steel plate 88 so that disc press-on insert 83 is displaced downwardly out of holding head 79 and presses disc 5 against turntable 8 by means of three nubs 89 which are disposed on its underside mutually offset by 120°. As soon as disc hold-down member 76 is moved out of this operating position again, the magnetic flux between magnet 85 as well as steel rod 87 and steel plate 88 causes disc press-on insert 83 to go back to its rest position. A sleeve 91 placed onto steel rod 87 and provided with an annular flange 90 prevents extraction of disc press-on insert 83 from holding head 79.

Disc player 1, all of whose motion sequences are monitored by a control device (not shown) operates as follows: if, for example, a disc 5 stored in the right disc storage magazine 3 has been selected by means of the keyboard on the operator panel, transporting device 4 moves to a height which coincides with the height of that compartment 10 of disc storage magazine 3 in which the selected disc 5 and its disc holder 6 are disposed. Then the extraction device 12 of transporting device 4 facing disc storage magazine 3 is put into operation so that initially the gripping arm 32 of carriage 35 engages the recess 31 of disc holder 6 facing it and then, by movement of carriage 35 until it stops at the other carriage 35, transports disc holder 6 and disc 5 from compartment 10 to supporting arm 33 of transporting device 4. As soon as disc holder 6 has taken on its final position on supporting arm 33, in which the disc 5 is concentric with the turntable 8 of playback unit 7, transporting device 4 moves in the direction of playback unit 7. When disc holder 6 is set down on playback unit 7, turntable 8 of playback unit 7 is introduced through opening 28 into disc holder 6 so that disc 5 is released from disc holder 6 and the central region of disc 5 comes to lie on turntable 8. At the same time, in this end position of transporting device 4, the attraction between magnet 85 and drive shaft 84 of turntable 8 urges the flat rubber ring 86 of disc press-on insert 83 of disc hold-down member 76 against the upper face of disc 5, thus causing the cone 82 of disc press-on insert 83 to be displaced upwardly out of receiving opening 80 in partition 81 of holding head 79. Then turntable 8 of playback unit 7 is caused to rotate, enabling playback head 9 to optically read out the information stored on disc 5 and then reproduce it, for example, in the form of music. At the end of the information readout from disc 5, the latter is returned in an analogous manner by transporting device 4 to its associated compartment 10. Then the transporting device returns empty to its end position above playback unit 7.

In the disc player 1 shown in FIG. 11, the left disc storage magazine 3 is shortened at its lower end by the height of a drawer 92 that can be introduced into and removed from disc player 1. Drawer 92 accommodates a disc holder 6 equipped with a disc 5 and, when drawer 92 is pushed in, this disc holder can be gripped by transporting device 4. For this purpose, disc holder 6 projects laterally beyond drawer 92. In the pulled-out state of drawer 92, it is easy to exchange disc 5 manually.

The described embodiment demonstrates the easy and practically manipulated structure of the disc player which, despite its simplicity, is nevertheless particularly reliable in operation.

I claim:

1. A disc player for playing discs, comprising:
   a plurality of disc holders, each disc holder accommodating one of the discs;
   a first storage magazine having compartments to store disc holders so that the discs accommodate therein are disposed parallel to one another in a first stack which extends in a stacking direction;
   a second storage magazine having compartments to store disc holders to that the discs accommodated therein are disposed parallel to one another in a second stack which extends in the stacking direction, the second storage magazine being spaced apart from the first storage magazine;
   a playback unit between the first and second storage magazines, the playback unit having a turntable;
   transporting device means for selectively moving disc holders and the discs they accommodate back and forth between the storage magazines and the playback unit, the transporting device means including
   a carrier member positioned to support a disc holder so that the disc accommodated therein is aligned with the turntable,
   first extraction device means for moving disc holders an the discs they accommodate back and forth between the first storage magazine and the carrier member along a path transverse to the stacking direction,
   second extraction device means for moving disc holders and the discs they accommodate back and forth between the second storage magazine and the carrier member along a path transverse to the stacking direction, and
   means for moving the carrier member along a carrier path which extends in the stacking direction, the turntable being disposed adjacent an end of the carrier path;
   a housing in which the playback unit and the transporting device means are mounted;
   first and second lock means for releasably securing the first storage magazine to the housing, the first storage magazine being pivotal about a pivot axis out of the housing after release of the first lock means and being removable from the housing after release of the second lock means; and
   first and second further lock means for releasably securing the second storage magazine to the housing, the second storage magazine being pivotal about a pivot axis out of the housing after release of the first further lock means and being movable from the housing after release of the second further lock means.

2. The disc player of claim 1, wherein the stacking direction and the carrier path are generally vertical, wherein the turntable is disposed adjacent the bottom end of the carrier path, wherein the disc accommodated by a disc holder that is supported on the carrier member is lifted from the disc holder and deposited on the turntable when the carrier member moves downward to the bottom end of the carrier path, and further comprising disc hold-down means, connected to the transport device means, for pressing the disc against the turntable.

3. The disc player of claim 1, wherein the second storage magazine has opposite sides that are open, the second extraction device means moving disc holders and the discs they accommodate back and forth between the second storage magazine and the carrier through one of the open sides, and further comprising another playback unit, and another transporting device means for selectively moving disc holders and the discs they accommodate back and forth between the second storage magazine and the another playback unit through the other open side of the second storage magazine.

4. The disc player of claim 1, further comprising a manually movable lever, and rod assembly means for connecting the lever to the first and second lock means in such a manner that displacement of the lever in one direction releases the first lock means and displacement of the lever in the opposite direction releases the second lock means.

5. The disc player of claim 1, wherein the first storage magazine comprises oppositely disposed spring means for releasably securing the disc holders in the compartments of the first storage magazine in such a manner that portions of the disc holders project out of the first storage magazine for access by the first extraction device means, and wherein the second storage magazine comprises oppositely disposed spring means for releasably securing the disc holders in the compartments of the second storage magazine in such a manner that portions of the disc holders project out of the second storage magazine for access by the second extraction device means.

6. The disc player of claim 5, wherein the disc holders have oppositely disposed long sides with recesses, wherein the first storage magazine has guide grooves, and wherein the oppositely disposed spring means of the first storage magazine comprises a spring element having legs engaged in the guide grooves and having a crossbar with a central notch to engage a recess of a disc holder.

7. A disc player for playing discs, comprising:
   a plurality of disc holders, each disc holder accommodating one of the discs, each disc holder having oppositely disposed long sides with recesses;
   a first storage magazine having compartments to store disc holders so that the discs accommodate therein are disposed parallel to one another in a first stack which extends in a stacking direction, the first storage magazine having guide grooves;
   a second storage magazine having compartments to store disc holders so that the discs accommodated therein are disposed parallel to one another in a second stack which extends in the stacking direction, the second storage magazine being spaced apart from the first storage magazine, the second storage magazine having guide grooves;
   a playback unit between the first and second storage magazines, the playback unit having a turntable; and
   transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a patch transverse to the stacking direction, second extraction device means for moving disc holders and the discs they accommodate back and forth between the second storage magazine and the carrier member along a path transverse to the stacking direction, and means for moving the carrier member along a carrier path which extends in the stacking direction, the turntable being disposed adjacent an end of the carrier path, wherein the first storage magazine includes oppositely disposed spring elements for releasably securing disc holders in the compartments of the first storage magazine in such a manner that portions of the disc holders project out of the first storage magazine for access by the first extraction device means, each spring element of the first storage magazine having legs which are engaged in the guide grooves of the first storage magazine and having a crossbar with a central notch to engage a recess of a disc holder, and wherein the second storage magazine includes oppositely disposed spring elements for releasably securing disc holders in the compartments of the second storage magazine in such a manner that portions of the disc holders project out of the second storage magazine for access by the second extraction device means, each spring element of the second storage magazine having legs which are engaged in the guide grooves of the second storage magazine and having a crossbar with a central notch to engage a recess of a disc holder.

8. The disc player of claim 7, wherein adjacent spring elements are combined into a continuous band.

9. The disc player of claim 7, wherein each disc holder has an underside with a plurality of nubs that are disposed in a plane which passes through the recesses.

10. The disc player of claim 9, further comprising switch means, positioned to cooperate with a nub of each holder, for detecting the presence of discs in the compartments.

11. The disc player of claim 7, wherein the discs have respective edge regions where no data are stored, and wherein each disc holder has a recess which accommodates a disc, the recess having a periphery with a sloping portion and a vertical portion, the recess additionally having a bottom with an opening into which the turntable can be introduced, the bottom of the recess further having a shoulder edge which is divided into two facing segments so as to support a disc at its edge region.

12. The disc player of claim 7, wherein the first extraction device means comprises a first gripping arm, wherein the second extraction device means comprises a second gripping arm, and wherein each disc holder has long sides with recesses to receive the gripping arms.

13. The disc player of claim 12, wherein the first extraction device means further comprises:

a carriage mounted for back and forth movement between a start position and an end position, the start position being adjacent the first storage magazine, the first gripping arm being mounted on the carriage for movement between an extended position and a withdrawn position;

means for holding the first gripping arm in its withdrawn position when the carriage is at its start position and for moving the first gripping arm to its extending position and into a recess of one of the disc holders when the carriage moves out of its start position toward an intermediate position between the start and end positions, the means for holding including a pivotally mounted angle lever, a stop lever articulated to the angle lever, and spring means for biasing the angle lever; and stationary stop means for keeping the first gripping arm in its extended position as the carriage moves between the intermediate position and the end position.

14. The disc player of claim 13, wherein the first extraction device means further comprises a stop angle member which delimits the start position, wherein the first gripping arm has a recess, and wherein the stop lever is positioned to engage the carriage as it moves into the start position and to pivot the angle lever into engagement with the recess so as to pull the first gripping arm to its withdrawn position.

15. A disc player for playing discs, comprising:

a plurality of disc holders, each disc holder accommodating one of the discs, each disc holder having long sides with recesses;

a first storage magazine having compartments to store disc holders so that the discs accommodated therein are disposed parallel to one another in a first stack which extends in a stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable; and transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a path transverse to the stacking direction, the first extraction device means including a first gripping arm, second extraction device means for moving disc holders and the discs they accommodate back and forth between the second storage magazine and the carrier member along a path transverse to the stacking direction, the second extraction device means including a second gripping arm, and means for moving the carrier member along a carrier path which extends in the stacking direction, the turntable being disposed adjacent an end of the carrier path, wherein the first gripping arm has a recess and the first extraction device means further includes a carriage mounted for back and forth movement between a start position and an end position, the start position being adjacent the first storage magazine, the first gripping arm being mounted on the carriage for movement between an extended position and a withdrawn position, a stop angle member which delimits the stop position, means for holding the first gripping arm in its withdrawn position when the carriage is at its start position and for moving the first gripping arm to its extending position and into one of the recess of one of the disc holders when the carriage moves out of its start position toward an intermediate position between the start and end positions, the means for holding including a pivotally mounted angle lever, a stop lever articulated to the angle lever, the stop lever being positioned to engage the carriage as it moves into the start position and to pivot the angle lever into engagement with the recess in the first gripping arm so as to pull the first gripping arm to its withdrawn position, and spring means for biasing the angle lever, and stationary stop means for keeping the first gripping arm in its extended position as the carriage moves between the intermediate position and the end position.

16. The disc player of claim 15, wherein the angle lever has a predetermined position when the carriage is at its start position, and further comprising means for optically detecting when the angle lever is in the predetermined position so as to determine when the carriage is at its start position.

17. A disc player for playing discs, comprising:

a plurality of disc holders, each disc holder accommodating one of the discs, each disc holder having long sides with recesses;

a first storage magazine having compartments to store disc holders so that the discs accommodated therein are disposed parallel to one another in a first stack which extends in a stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable; and transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a path transverse to the stacking direction, the first extraction device means including a first gripping ar, the first gripping arm having a rear face, second extraction device means for moving disc holders and the discs they accommodate back and forth between the second storage magazine and the carrier member along a path transverse to the stacking direction, the second extraction device means including a second gripping arm, a chassis on which the carrier and the first and second extraction device means are mounted, the chassis having an upper portion, and means for moving the carrier member along a carrier path which extends in the stacking direction, the turntable being disposed adjacent an end of the carrier path, wherein the first extraction device means further includes a carriage mounted for back and forth movement between a start position and an end position, the start position being adjacent the first storage magazine, the first gripping arm being mounted on the carrier for movement between an extended position and a withdrawn position, means for holding the first gripping arm in its withdrawn position when the carriage is at its start position and for moving the first gripping arm to its extending position and into one of the recesses of one of the disc holders when the carriage moves out of its start position toward an intermediate position between the start and end positions, the means for holding including a pivotally mounted angle lever, a stop lever articulated to the angle lever, and spring means for biasing the angle lever, and stationary stop means for keeping the first gripping arm in its extended position as the carriage moves between the intermediate position and the end position, the stationary stop means including a wall attached to the upper portion of the chassis and a round pin adjacent an end of the wall for engaging the rear face of the first gripping arm.

18. The disc player of claim 17, wherein the transporting device means further comprises a supporting rod, the carriage being slidably mounted on the supporting rod, and wherein the first extraction device means further comprises means for driving the carriage, the means for the driving including a reversible motor, a belt that is operatively connected to the carriage, and means for coupling the motor to the belt, the means for coupling including a worm gear.

19. The disc player of claim 18, wherein the belt is a toothed belt, and wherein the means for coupling the motor to the belt further comprises a drive wheel around which the belt is looped, and a friction coupling between the worm gear and the drive wheel.

20. A disc player for playing discs, comprising:

a plurality of disc holders, each disc holder accommodating one of the discs;

a first storage magazine having compartments to store disc holders so that the discs accommodated therein are disposed parallel to one another in a first stack which extends in a stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable; and transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a path transverse to the stacking direction, second extraction device means for moving disc holders and the discs they accommodate back and forth between the second storage magazine and the carrier member along a path transverse to the stacking direction, and means for moving the carrier member along a carrier path which extends in the stacking direction, the turntable being disposed adjacent an end of the carrier path, wherein the first extraction device means includes a first carriage mounted for back and forth movement between a start position and an end position, and first gripping means for gripping one of the disc holders to the first carriage, the start position of the first carriage being adjacent the first storage magazine and the end position of the first carriage being selected so that the one of the disc holders gripped by the first gripping means is disposed at a predetermined position on the carrier member when the first carriage is at its end position, wherein the second extraction device means includes a second carriage mounted for back and forth movement between a start position and an end position, and second gripping means for gripping one of the disc holders to the second carriage, the start position of the second carriage being adjacent the second storage magazine and the end position of the second carriage being selected so that the one of the disc holders gripped by the second gripping means is disposed at the predetermined position on the carrier member when the second carriage is at its end position, and wherein the first carriage abuts against the second carriage when the second carriage is in its start position and the first carriage moves to its end position, and the second carriage abuts against the first carriage when the first carriage is in its start position and the second carriage moves to its end position.

21. The disc player of claim 20, wherein the disc holders have light passage openings, and further comprising means cooperating with the light passage openings for optically detecting when the disc accommodated in one of the disc holders has been moved to the predetermined position on the carrier member.

22. The disc player of claim 20, wherein the carrier member has a first end that is oriented toward the first storage magazine and a second end that is oriented toward the second storage magazine, and further comprising means adjacent each end of the carrier member for optically detecting when a disc holder has been moved to the predetermined position on the carrier member.

23. The disc player of claim 20, wherein the transporting device means further comprises a chassis on which the carrier member and the first and second extraction device means are mounted, and a plurality of rods on which the chassis is slidably mounted, the rods extending in the stacking direction, and wherein the means for moving the carrier comprises a reversible motor, and double belt drive means for linking the motor to the chassis.

24. The disc drive of claim 23, wherein the motor is a stepping motor having a shaft, and further comprising a vane wheel mounted on the shaft of the motor, and fork coupler means through which the vane wheel passes for generating positioning pulses.

25. The disc player of claim 20, wherein the stacking direction and the carrier path are generally vertical, wherein the turntable is disposed adjacent the bottom end of the carrier path, wherein the disc accommodated by a disc holder that is supported on the carrier member is lifted from the disc holder and deposited on the turntable when the carrier member moves downward to the bottom end of the carrier path, and further comprising disc hold-down means, connected to the transport device means, for pressing the disc against the turntable.

26. The disc player of claim 25, wherein the playback unit further comprises a magnetizable drive shaft for the turntable, and wherein the disc hold-down means comprises a holding arm parallel to the carrier member, and a holding head mounted on the holding arm, the holding head including a disc press-on insert, means for mounting the disc press-on insert so that it is longitudinally displaceable and free to swing back and forth, and a magnet mounted on the disc press-on insert, the magnet cooperating with the magnetizable drive shaft.

27. The disc player of claim 26, wherein the holding head further comprises an elastomer ring mounted on the disc press-on insert.

28. The disc player of claim 26, wherein the holding head further comprises a partition having an opening, and wherein the means for mounting the disc press-on insert comprises an element having a conical end, the element extending through the opening in the partition and being connected to the disc press-on insert.

29. The disc player of claim 25, wherein the playback unit further comprises a magnetizable drive shaft for the turntable, and wherein the disc hold-down means comprises a holding arm parallel to the carrier member, and a holding head mounted on the holding arm, the holding head including a disc press-on insert, a magnetizable metal plate, and magnetic means connected to the disc press-on insert for urging the disc press-on insert toward the magnetizable metal plate when the holding head is spaced apart from the turntable and for urging the disc press-on insert toward the magnetizable drive shaft when the holding head is close to the turntable.

30. The disc player of claim 29, wherein the holding head further comprises a cover with an underside, the magnetizable metal plate being clipped onto the underside of the cover, and wherein the magnetic means comprises a magnet, and a magnetizable metal rod disposed between the magnet and the magnetizable metal plate.

31. A disc player for playing discs, comprising:
a plurality of disc holders having light passage openings, each disc holder accommodating one of the discs;

a first storage magazine having compartments to store disc holders so that the discs accommodated therein are disposed parallel to one another in a first stack which extends in a stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable;

transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a path transverse to the stacking direction, second extraction device means for moving disc holders and the discs they accommodate back and forth between the second storage magazine and the carrier member along a path transverse to the stacking direction, and means for moving the carrier member along a carrier path which extends in the stacking direction, the turntable being disposed adjacent an end of the carrier path; and means cooperating with the light passage openings of the disc holders for optically detecting when the disc accommodated in one of the disc holders has been moved to a predetermined position on the carrier member.

32. A disc player for playing discs, comprising:

a plurality of disc holders, each disc holder accommodating one of the discs;

a first storage magazine having compartments to store disc holders so that the discs accommodated therein are disposed parallel to one another in a first stack which extends in a generally vertical stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable and a magnetizable drive shaft for the turntable;

transporting device means for selectively moving disc holders and the discs they accommodate back and forth between the storage magazines and the playback unit, the transporting device means including a carrier member positioned to support a disc holder so that the disc accommodated therein is aligned with the turntable, first extraction device means for moving disc holders and the discs they accommodate back and forth between the first storage magazine and the carrier member along a path transverse to the stacking direction, second extraction device means for moving disc holders and the discs they accommodate back and forth between the second storage magazine and the carrier member along a path transverse to the stacking direction, and means for moving the carrier along a generally vertical carrier path having a bottom end, the turntable being disposed adjacent the bottom end of the carrier path, the carrier and the turntable being arranged such that the disc accommodated by a disc holder that is supported on the carrier member is lifted from the disc holder and deposited on the turntable when the carrier member moves to the bottom end of the carrier path; and disc hold-down means, connected to the transport device means, for pressing the disc against the turntable, the disc hold-down means including a holding arm parallel to the carrier member, and a holding head mounted on the holding arm, the holding head including a cover having an underside, a disc press-on insert, a magnetizable metal plate clipped onto the underside of the cover, and magnetic means connected to the disc press-on insert for urging the disc press-on insert toward the magnetizable metal plate when the holding head is spaced apart from the turntable and for urging the disc press-on insert toward the magnetizable drive shaft when the holding head is close to the turntable, the magnetic means including a magnet, and a magnetizable metal rod disposed between the magnet and the magnetizable metal plate.

33. The disc player of claim 32, wherein the disc press-on insert has a periphery and an underside, and includes three nubs on its underside adjacent its periphery, the nubs being spaced at 120° intervals and urging a disc onto the turntable when the magnet is close to the magnetizable drive shaft.

34. The disc player of claim 32, further comprising a drawer adjacent the first storage magazine and movable between an open position and a closed position, the drawer holding a disc holder so that a disc accommodated therein can be manually exchanged when the drawer is in its open position, the disc accommodated by the disc holder in the drawer being disposed in the first stack and being accessible to the transporting device means when the drawer is in its closed position.

35. A disc player for playing discs, comprising:

a plurality of disc holders, each disc holder accommodating one of the discs;

a first storage magazine having compartments to store disc holders so that the discs accommodated therein are disposed parallel to one another in a first stack which extends in a generally vertical stacking direction;

a second storage magazine having compartments to store disc holders so that the discs accommodated therein are disposed parallel to one another in a second stack which extends in the stacking direction, the second storage magazine being spaced apart from the first storage magazine;

a playback unit between the first and second storage magazines, the playback unit having a turntable;

transporting device means for selectively moving disc holders and the discs they accommodate back and forth between the storage magazines and the playback unit, the transporting device means including
a carrier member positioned to support a disc holder so that the disc accommodated therein is aligned with the turntable,
first extraction device means for moving disc holders and the discs they accommodate back and forth between the first storage magazine and the carrier member along a path transverse to the stacking direction,
second extraction device means for moving disc holders and the discs they accommodate back and forth between the second storage magazine and the carrier member along a path transverse to the stacking direction, and
means for moving the carrier member along a generally vertical carrier path having a bottom end, the turntable being disposed adjacent the bottom end of the carrier path,
an operator key;
means responsive to the operator key for actuating the means for moving so as to move the carrier member to the top end of the carrier path and then to the bottom end; and
another operator key for switching on the playback unit.

* * * * *